US006351608B1

(12) United States Patent
 Constable

(10) Patent No.: US 6,351,608 B1
(45) Date of Patent: Feb. 26, 2002

(54) ONE-TIME-USE CAMERA WITH EXTERNAL FLASH UNIT

(75) Inventor: Douglas W. Constable, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/535,870

(22) Filed: Mar. 27, 2000

(51) Int. Cl.[7] .............................................. G03B 15/03
(52) U.S. Cl. ........................... 396/155; 396/6; 396/158; 396/198; 396/171
(58) Field of Search .............................. 396/6, 28, 155, 396/172, 171, 176, 180, 158, 182, 189, 198, 199

(56) References Cited

U.S. PATENT DOCUMENTS

| 3,113,495 A | * | 12/1963 | Brandt et al. ............... 396/182 |
| 4,049,996 A | | 9/1977 | Vital et al. |
| 4,183,647 A | * | 1/1980 | Kuraishi ..................... 396/182 |
| 4,903,058 A | | 2/1990 | Schappler |
| 4,973,998 A | | 11/1990 | Gates |
| 5,003,330 A | | 3/1991 | Kotani et al. |
| RE34,168 E | | 1/1993 | Ohmura et al. |
| 5,384,611 A | | 1/1995 | Tsuji et al. |
| 5,678,075 A | * | 10/1997 | Doukas ....................... 396/171 |
| 5,721,971 A | | 2/1998 | Sasaki |
| 5,752,097 A | | 5/1998 | McIntyre |
| 5,761,541 A | | 6/1998 | Constable et al. |
| 5,781,804 A | | 7/1998 | Constable |

* cited by examiner

*Primary Examiner*—Russell Adams
*Assistant Examiner*—Arthur A Smith
(74) *Attorney, Agent, or Firm*—Francis H. Boos, Jr.

(57) ABSTRACT

A one-time-use camera with a built-in flash unit and an external flash unit system in which the external flash unit is devoid of a charger circuit and battery power supply. The external flash unit is connected to the camera built-in flash unit's flash capacitor and flash trigger circuit via interconnecting terminals provided on the camera and external flash unit. The external flash unit includes circuit means for disabling camera flash trigger circuit so as to prevent the camera flash emission device from operating. A signal pulse is sent from the camera trigger circuit to an SCR trigger switch in the external flash trigger switch to initiate flash operation in the external flash unit. By virtue of mounting the flash emission device of the external unit farther away from the taking lens than the built-in flash device and disabling the operation of the internal flash unit, red-eye on the subject being photographed is substantially eliminated.

5 Claims, 5 Drawing Sheets

ONE-TIME-USE CAMERA WITH EXTERNAL FLASH UNIT

CROSS REFERENCE TO RELATED APPLICATIONS

Reference is made to co-pending U. S. application Ser. No. 09/536,182 entitled FLASH APPARATUS WITH ONE-TIME USE CAMERA, by Douglas W. constable et al. filed concurrently herewith.

FIELD OF THE INVENTION

The invention relates generally to the field of photography, and in particular to attachable flash apparatus useful with one-time-use cameras.

BACKGROUND OF THE INVENTION

One-time-use cameras are rapidly gaining in popularity due to in large part to their convenience and low cost relative to user-reloadable cameras. Many of such cameras include a built-in flash device to enable indoor picture taking. For cost reasons, such flash devices are typically fixed in place and, because of the small size of the cameras, are necessarily located close to the optical axis of the taking lens. As a result, the phenomenon known as "red-eye" becomes a problem. Red-eye occurs when flash light is reflected by a subject's retina through the taking lens onto the exposed image frame. Numerous techniques are known for reducing the red-eye effect. One of such techniques involves the use of a pop-up flash device that moves the flash emitter away from the optical axis of the taking lens. Such a built-in, pop-up arrangement, while effective, is costly to implement and would not be suitable for one-time-use cameras where cost must be kept at a minimum.

U.S. Pat. No. 5,384,611 discloses a user-reloadable camera with a retractable built-in flash and provision for attachment of an external flash. When the external flash is mounted on the camera, the retractable flash which is close to the optical axis of the taking lens is retracted into the camera and does not fire. Thus, the external flash unit and built-in flash unit do not fire simultaneously. Since the spaced, externally mounted flash is the sole source of flash emission, the red-eye effect is effectively eliminated. However, the disclosed arrangement involves the use of a movable built-in flash unit which requires that, when the external flash is mounted on the camera, the built-in flash be moved to cause the built-in flash to be inactivated, a costly feature for one-time-use cameras. Moreover, the externally mounted flash unit is a self-contained unit that requires the unit have its own flash charging circuit and battery power supply. It is desirable for cost reasons that such components be eliminated from the external flash unit.

SUMMARY OF THE INVENTION

In accordance with the invention, therefore, there is provided a one-time-use camera and detachable flash system which comprises a one-time-use camera having a housing, a first mounting structure accessible on an outer surface of the housing, a taking lens, and a built-in flash unit, the built-in flash unit having a charging circuit, a main flash capacitor, a first flash emission device fixedly mounted in the camera, and a flash trigger circuit including a trigger switch, the camera further including externally accessible electrical terminals connected to the main flash capacitor and to the flash trigger circuit. The system further comprises an external flash unit having a second flash emission device and a housing with a second mounting structure thereon configured to mate with the first mounting structure on the camera housing permitting the external flash unit to be detachably mounted on the camera with the second flash emission device spaced farther away from the taking lens than the first flash emission device. The external flash unit is devoid of a charging circuit and battery power supply and further includes an electronically actuated flash trigger circuit, circuit means connected to the electronically actuated flash trigger circuit, and external electrical connection terminals connected to the electronically actuated flash trigger and to the second flash emission device. The electrical connection terminals are positioned on the external flash unit housing such that, when the external flash unit is mounted on the camera, the second flash emission device is connected to the camera flash capacitor and the circuit means is connected to the camera trigger circuit. The circuit means is operative to disable the camera trigger circuit from initiating flash emission by the first flash emission device and is responsive to closure of the trigger switch to send a pulse signal from the camera trigger circuit to the external flash trigger circuit to initiate flash emission by the second flash emission device. By virtue of the farther away spacing of the second flash emission device from the taking lens than the first flash emission device and the disabling of the first flash emission device, red-eye effect from a subject being photographed is substantially eliminated.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
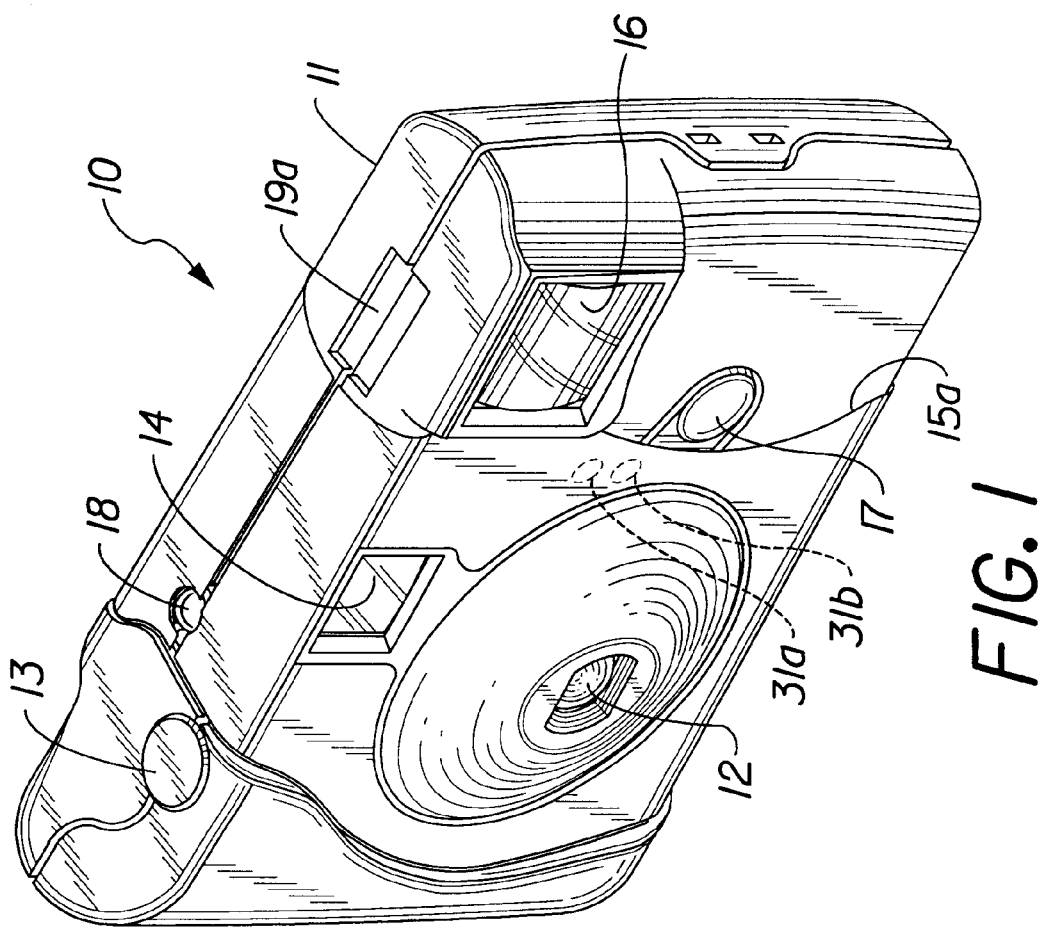
FIG. 1 is an isometric view of a one-time-use camera adapted for mounting of an external flash unit in accordance with a first embodiment of the present invention.
Figure 2:
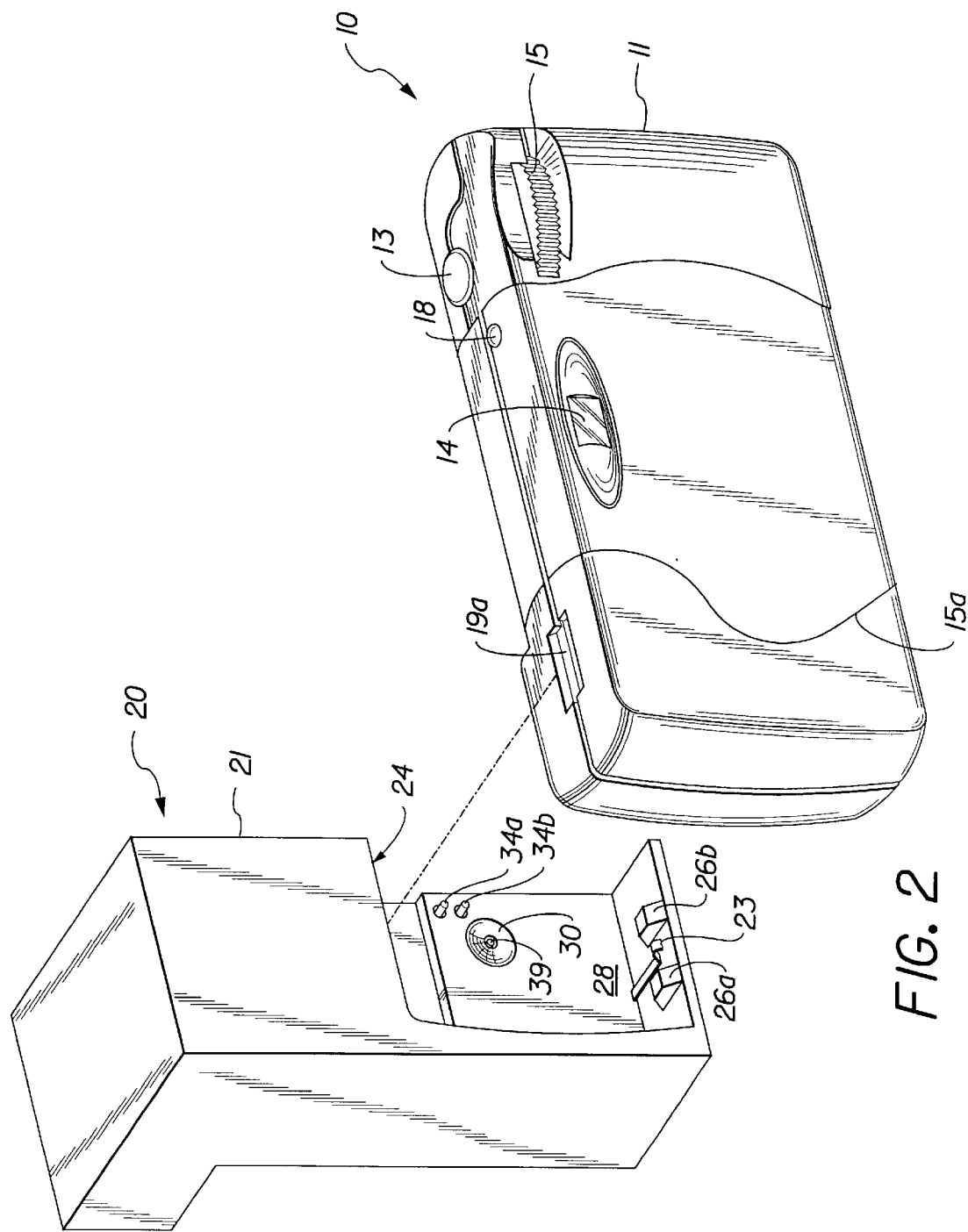
FIG. 2 is a rear isometric exploded view of a camera system according to the first embodiment of the invention.
Figure 3:
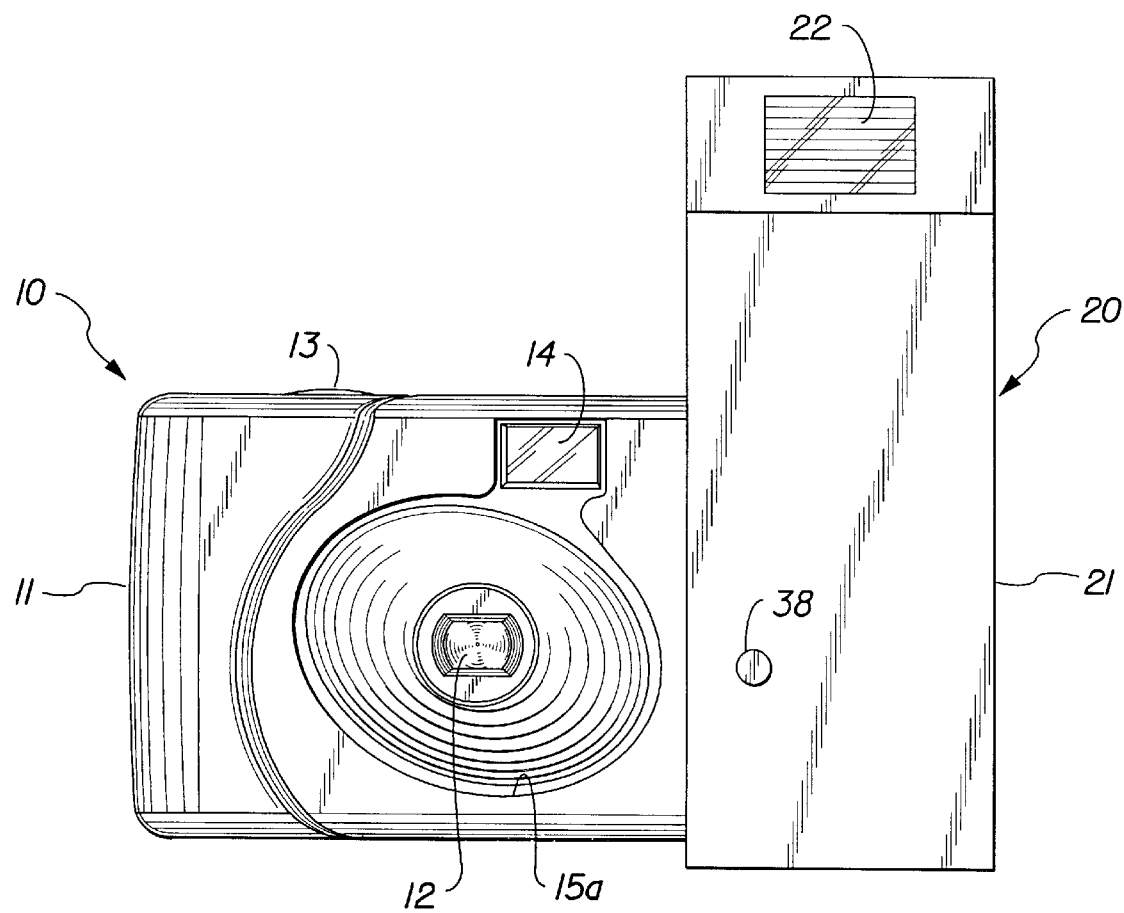
FIG. 3 is a front elevation view of the camera system of FIG. 2 with an external flash unit mounted on the camera.

Referring jointly to FIGS. 1–3, a one-time-use camera and detachable flash system is shown which comprises a one-time-use camera 10 and an external flash unit 20. The camera comprises a housing 11, a taking lens 12, a shutter release button 13, a viewfinder 14 and a film advance wheel 15. A label sheet 15a is typically placed around the front and back of the camera to provide printed material such as operating instructions and a company logo. The label sheet also serves to hide any holes in the camera housing which might be used for circuit testing purposes and the like during manufacturing of the camera. The illustrated camera is provided with a built-in flash unit which includes a flash emission device 16, a flash charger start button 17 and a flash charge ready light 18. The trend in the design of a one-time-use camera is to make the camera as small as possible for the convenience of the user. It is also important to keep the manufacturing cost as low as possible. As the size of the camera is reduced, the built-in flash emission device 16 becomes closer to the optical axis of the taking lens which increases the red-eye effect, particularly when taking indoor pictures of human and animal subjects. The need to keep manufacturing costs as low as possible dictates against the use of pop-up flash devices which are commonly used in more costly user-reloadable cameras to temporarily move the flash emission device away from the optical axis of the taking lens for picture taking operations.

Figure 5A:
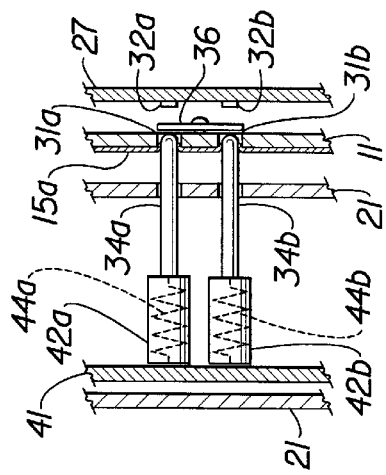
FIGS. 5a and 5b illustrate features of the interconnection arrangement between the camera and external flash unit.
Figure 6:
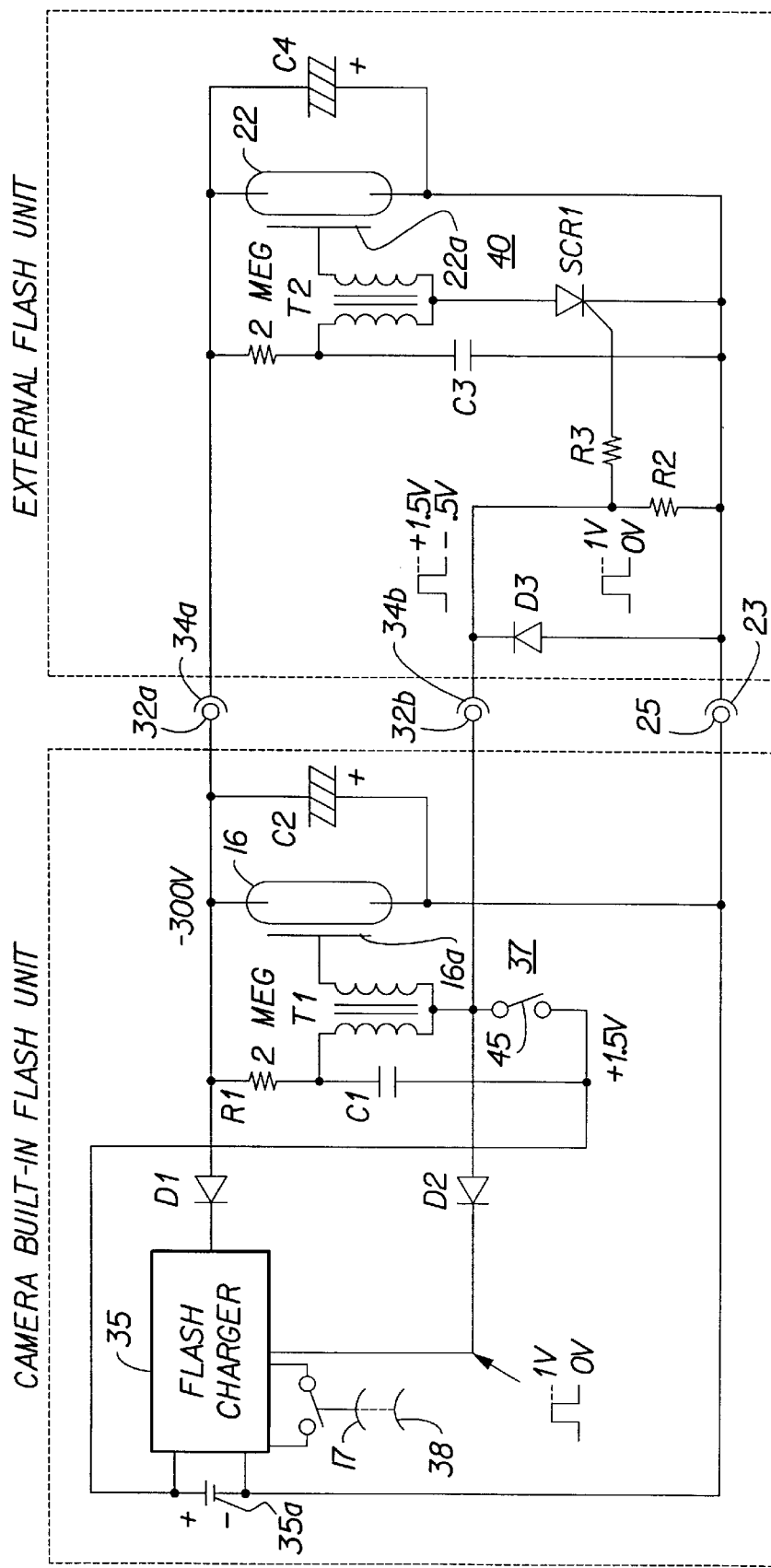
FIG. 6 is a partially schematic, block diagram of electronic circuits useful in the camera system of the invention.

In accordance with the system of the invention, an external flash unit 20 is provided to serve, when mounted on camera 10, as the primary flash unit for the system with a flash emission device spaced sufficiently away from the taking lens optical axis to substantially eliminate the subject red-eye effect. To this end, camera 10 includes a first mounting structure accessible on an outer surface of the housing which comprises a pair of recesses 19a and 19b (FIG. 4a) formed in the upper and lower surfaces of the camera housing 11. Housing 11 also includes holes 31a and 31b which are aligned with internal electrical terminals 32a and 32b, respectively, on circuit board 27 in the camera (FIG. 5a). Terminal 32a is connected to main flash capacitor C2 and terminal 32b is connected to a flash trigger circuit 37 included in the camera built-in-flash unit, as seen in FIG. 6. The holes, which are covered by label 15a, provide external access to these internal terminals as will be described in more detail later.

Figure 4B:
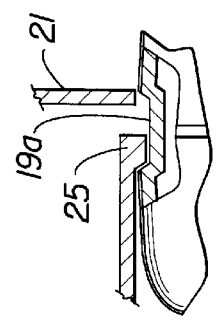
FIGS. 4b and 4c are cutaway details of a portion of the FIG. 4 camera system showing details of mounting and electrical connection arrangements therefor.
Figure 4C:
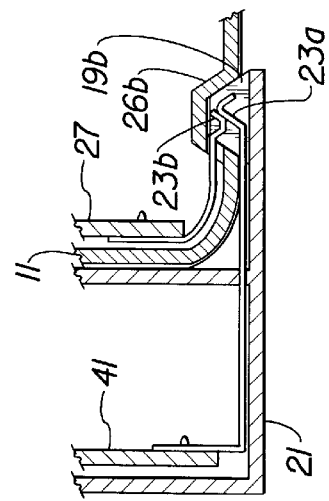
Figure 4A:
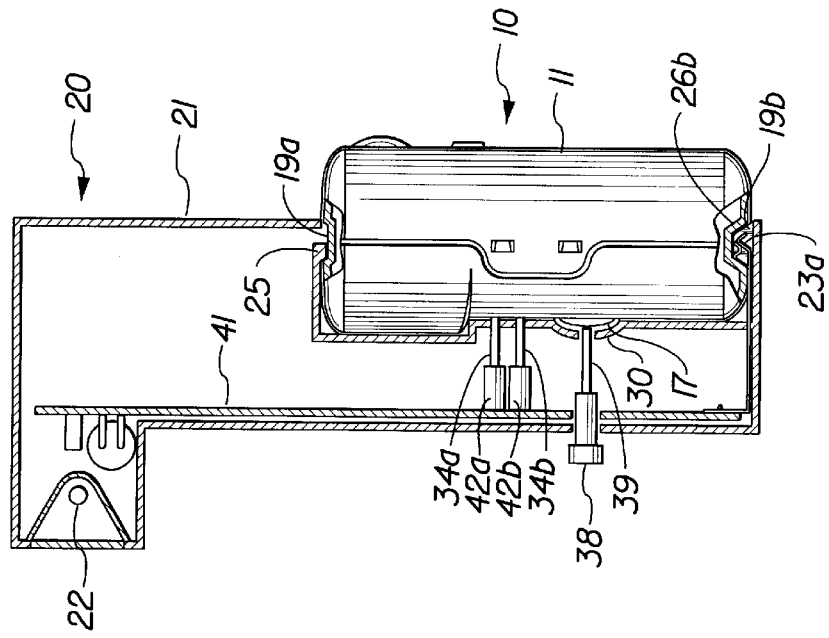
FIG. 4a is a side elevation view of the camera system of FIG. 2 with the external flash unit shown in section.

Referring now also to FIGS. 4a–4c, the external flash unit 20 comprises an elongated housing 21 having, at the upper end, a flash emission device 22. In accordance with an aspect of the invention, the external flash unit is devoid of any flash charging circuit and any battery power supply. Housing 21 is provided with a second mounting structure that is configured to mate with the first mounting structure on camera 10. This second mounting structure comprises an open chamber 24 in the lower portion of the housing 21 and includes a detent 25 on the upper surface of the chamber (FIGS. 4a and 4b) and a pair of separated detents 26a and 26b on the lower surface of the chamber (FIG. 2). The mating detents and camera recesses allow the external flash unit to be snapped in place on the camera from the front as shown in FIG. 2. As best seen in FIGS. 2 and 4a, the chamber surface 28 facing the front of the camera is provided with a spherical recess 30 that allows charger start button 17 to continue to project slightly, in its normal manner, beyond the surface of camera housing 11 after the flash unit is mounted on the camera. A user-operated plunger button 38 extends through the front surface of the flash unit 20 and includes a plunger pin 39 that extends rearwardly through the center of the spherical recess 30. With this arrangement, depressing button 38 will depress starter button 17 to start a charging operation in the camera.

An electrical contact terminal 23a from a circuit board 41 inside of external flash unit 20 extends outwardly between detents 26a and 26b to engage a mating electrical contact terminal 23b in camera recess 19b which, in turn, is connected to a ground terminal on printed circuit board 27 inside camera 10. Pins 34a and 34b comprise first and second external electrical connection terminals connected to flash emission device 22 and to an electronically actuated flash trigger circuit 40 (FIG. 6) formed on printed circuit board 41. The arrangement is such that, when external flash unit 20 is mounted on camera 10, the main flash capacitor in the camera is connected to the flash emission device 22 in the external flash unit and the flash trigger circuit 37 of the camera is connected to the flash trigger circuit 40 of the external flash unit.

Figure 5B:
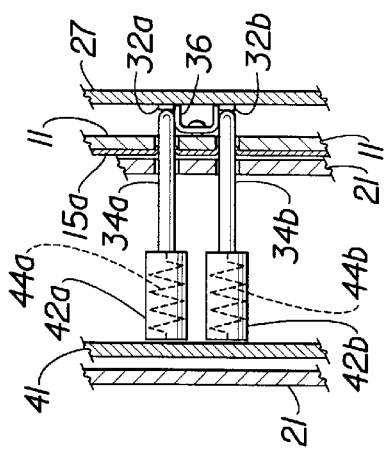

Referring to FIGS. 5a and 5b, the arrangement for connection of the external pin terminals 34a and 34b to the camera circuit board terminals 32a and 32b is seen in greater detail. The pin terminals are mounted on board 41 and preferably are slidably journalled in cylinders 42a and 42b and are spring loaded by means of springs 44a and 44b. When the external flash unit 20 is snapped onto the front of camera 10 with detents 25, and 26a,b lodged in recesses 19a and 19b, the pins 34a,b pierce the label sheet 15a. Preferably, a flexible cover 36 is attached to the inner surface of camera housing 11 so that, in an unflexed condition, the cover blocks the holes 31a,b. When pins 34a,b enter the holes, cover 36 flexes to allow the pins to access and contact terminals 32a,b on the camera printed circuit board. When the external flash unit is detached from the camera, the cover 36 returns to its position blocking holes 31a,b. The spring loading of the pins provides for some spacing tolerance between the external flash unit and the camera and assures good electrical connection of the pins to the camera contact terminals.

FIG. 6 shows circuits, partially in schematic and partially in block form, which may be used in the camera flash unit and the external flash unit in accordance with a preferred embodiment of the invention. The camera flash unit comprises a charging circuit 35, a charge pulse rectifying diode D1, a main flash capacitor C2, a trigger circuit 37 and flash emission device 16. Trigger circuit 37 includes step-up transformer T1, trigger capacitor C1, trigger electrode 16a and trigger switch 45 typically actuated by opening of the camera taking lens shutter (not shown). Trigger switch 45 is connected from the bottom of transformer T1 to the positive anode of a 1.5 volt battery 35a. A diode D2, connected from trigger circuit 37 to charger circuit 35 comprises a feedback circuit responsive to closure of trigger switch 45 to restart charging operation of the flash charger circuit 35 following the taking of each picture.

The circuit for external flash unit includes flash emission device 22, a supplemental flash capacitor C4, and an electronically actuated trigger circuit 40. Circuit 40 includes step up transformer T2, capacitor C3, trigger electrode 22a and an electronic trigger switch SCR1. The gate of switch SCR1 is connected via resistor R3 and connection terminals 34b, and 32b to trigger switch 45 in the camera. A diode D3 and resistor R2 are connected from common (ground) terminal 23 to connection terminal 34b. It will be appreciated that, with the external flash unit mounted on the camera, the flash capacitor C4 and flash emission device 22 are in parallel with the flash capacitor C2 and flash emission device 16 of the camera and, for this reason, the flash capacitor C4 can be a smaller, supplemental capacitor. For this reason also, there is no need in the external flash unit for a charging circuit or a separate battery power supply.

In operation, with the external flash unit mounted on the camera, operation of flash charging circuit 35 is started by depressing button 38 thereby closing the start charge switch operated by start button 17. Both of the flash capacitors C2 and C4 are charged through rectifier diode D1. Diode D3 shorts camera trigger capacitor C1 to ground through the primary winding of step-up transformer T1. This has the effect of disabling the camera trigger circuit 37 from initiating flash emission from flash emission device 16 when flash trigger switch 45 is closed. Instead, closure of trigger switch 45 sends a 1.5 volt pulse signal to the gate of SCR1 which actuates trigger circuit 40 to initiate flash emission from flash emission device 22. Resistor R3 acts to current-limit the pulse signal sent to the gate of SCR1. Additionally, diode D2 generates a 1.0 volt pulse when trigger switch 45 is closed which is sent back to charge circuit 35 to restart the flash capacitor charging operation. This will occur even though diode D3 is connected to transformer T1 since diode D3 only shorts out the negative 300 volt charge on the trigger capacitor C1.

The invention has been described in detail with particular reference to certain preferred embodiments thereof, but it will be understood that variations and modifications can be effected within the spirit and scope of the invention.

PARTS LIST 10 one-time-use camera
11 camera housing
12 taking lens
13 shutter release button
14 viewfinder
15 film advance wheel
15a label sheet
16 camera flash emission device
17 flash charger start button
18 flash charge ready light
19a,b mounting recesses
20 external flash unit
21 external flash unit housing
22 flash emission device
23a,b electrical contact terminals
24 open mounting chamber
25 mounting detent
26a,b mounting detents
27 printed circuit board—camera
28 chamber surface
30 spherical recess
31a,b holes in camera housing
32a,b internal flash unit connection terminals
34a,b external flash unit connection terminals
35 flash charger circuit
36 flexible holes cover
37 flash trigger circuit—camera
38 plunger button
39 plunger pin 10 one-time-use camera

What is claimed is:

1. A one-time-use camera and detachable flash system comprising:

(a) a one-time-use camera having:
a housing with a first mounting structure accessible on an outer surface of the housing;
a taking lens,
a built-in flash unit, the built-in flash unit having a charging circuit, a main flash capacitor, a first flash emission device fixedly mounted in the camera, and a flash trigger circuit including a trigger switch, and
first and second externally accessible electrical terminals connected, respectively, to said main flash capacitor and to said flash trigger circuit; and (b) an external flash unit being devoid of a charging circuit and battery power supply and having:

a housing with a second mounting structure thereon configured to mate with said first mounting structure,
an electronically actuated flash trigger circuit,
a second flash emission device,
a first external electrical connection terminal connected to said second flash emission device,
a second external electrical connection terminal connected to said electronically actuated flash trigger circuit, said first and second external electrical connection terminals being positioned on said external flash unit housing such that, when said external flash unit is mounted on said one-time-use camera, said second flash emission device is connected to said camera main flash capacitor and said electronically actuated flash trigger circuit is connected to said camera flash trigger circuit, and
circuit means connected to said second external electrical connection terminal, said circuit means being operative during a photographing operation to disable said camera trigger circuit from initiating flash emission by said first flash emission device;
whereby said electronically actuated flash trigger circuit is responsive to a pulse signal generated in said camera flash trigger circuit upon closure of said trigger switch to initiate flash emission by said second flash emission device and whereby said farther away spacing of said second flash emission device and disabling of said first flash emission device substantially eliminates red-eye effect from a subject being photographed.

2. The system of claim 1 wherein said camera flash unit further includes a flash charging circuit and a feedback circuit coupled between said camera flash trigger circuit and said flash charging circuit which feedback circuit is responsive to closure of said camera trigger switch to restart operation of said flash charging circuit.

3. The system of claim 1 wherein said camera housing defines holes therein aligned with said externally accessible electrical terminals, said camera including flexible covers which, in an unflexed condition, normally block said holes and which flex to allow insertion of said external electrical connection terminals for connections to said externally accessible electrical terminals upon mounting of said external flash unit onto said camera.

4. The system of claim 1 wherein said electronically actuated trigger circuit includes an SCR switch and said pulse signal from said camera is connected to a gate terminal of said SCR switch.

5. A detachable, external flash unit for use with a one-time-use camera, the one-time-use camera having a flash charging circuit, a main flash capacitor, a first flash emission device and a flash trigger circuit which includes a flash trigger switch, the external flash unit comprising:

a housing being devoid of a charging circuit and battery power supply and having mounting structure thereon configured to mate with mounting structure on a one-time-use camera;
an electronically actuated flash trigger circuit;
a second flash emission device;
a first external electrical connection terminal connected to said second flash emission device, and a second external electrical connection terminal connected to said electronically actuated flash trigger circuit, said first and second external electrical connection terminals being positioned on said external flash unit housing such that, when said external flash unit is mounted on said one-time-use camera, said second flash emission device is connected to said camera flash capacitor and said electronically actuated flash trigger circuit is connected to said camera trigger circuit; and circuit means connected to said second external electrical connection terminal, said circuit means being operative during a photographing operation to disable said camera flash trigger circuit from initiating flash emission by said first flash emission device;

whereby said electronically actuated flash trigger circuit is responsive to a pulse signal generated in said camera flash trigger circuit upon closure of said trigger switch to initiate flash emission by said second flash emission device.

* * * * *